US 8,013,766 B2

United States Patent
Van Der Vleuten

(10) Patent No.: US 8,013,766 B2
(45) Date of Patent: Sep. 6, 2011

(54) DEVICE AND METHOD FOR CODING A DATA SIGNAL AND DEVICE AND METHOD FOR DECODING A DATA SIGNAL

(75) Inventor: Renatus Josephus Van Der Vleuten, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 141 days.

(21) Appl. No.: 12/438,058

(22) PCT Filed: Aug. 27, 2007

(86) PCT No.: PCT/IB2007/053407
§ 371 (c)(1),
(2), (4) Date: Feb. 19, 2009

(87) PCT Pub. No.: WO2008/026145
PCT Pub. Date: Mar. 6, 2008

(65) Prior Publication Data
US 2010/0231426 A1    Sep. 16, 2010

(30) Foreign Application Priority Data
Aug. 30, 2006    (EP) ..................... 06119754

(51) Int. Cl.
*H03M 7/00* (2006.01)
(52) U.S. Cl. ......................... 341/107; 704/219
(58) Field of Classification Search ............ 341/50–109; 382/232, 244–247, 166, 159; 704/219, 500; 375/350, 229, 285, 341, 371, 348; 370/252, 370/537; 380/205, 242, 100, 232
See application file for complete search history.

(56) References Cited

U.S. PATENT DOCUMENTS

| | | | |
|---|---|---|---|
| 5,867,114 A * | 2/1999 | Barbir | 341/107 |
| 6,269,338 B1 * | 7/2001 | Bruekers et al. | 704/500 |
| 6,320,986 B1 | 11/2001 | Strohacker | |
| 6,606,037 B2 * | 8/2003 | Ekstrand et al. | 341/50 |
| 6,671,415 B1 | 12/2003 | Lei | |
| 6,744,929 B1 | 6/2004 | Okada | |
| 6,987,739 B2 * | 1/2006 | Kitazawa et al. | 370/252 |
| 7,171,053 B2 * | 1/2007 | Van der Vleuten | 382/244 |
| 7,334,129 B1 * | 2/2008 | Kamperman et al. | 713/176 |
| 7,539,692 B2 * | 5/2009 | Min et al. | 1/1 |
| 2002/0110193 A1 | 8/2002 | Yoo et al. | |
| 2003/0007696 A1 | 1/2003 | Saito | |
| 2003/0179938 A1 | 9/2003 | Van der Vleuten | |

FOREIGN PATENT DOCUMENTS

| | | |
|---|---|---|
| EP | 1359762 A1 | 11/2003 |
| EP | 1591963 A1 | 11/2005 |
| WO | 0111893 A1 | 2/2001 |
| WO | 2006007279 A2 | 1/2006 |

* cited by examiner

*Primary Examiner* — Lam T Mai

(57) ABSTRACT

In a method for encoding and an encoder statistical information is generated and said statistical information (LSB=F (MSB) about the reconstruction values to be used during reconstruction (sometimes called "inverse quantization") is added to the encoded data signal. The encoded data signal comprises data information providing information on the relation between parts of the original input data removed during quantization and the quantized data. The decoder and decoding method use the information data during reconstruction. This enables reconstruction values to be used during reconstruction that can adapt to the input data statistics thereby improving data reconstruction and reducing the quantization error. The reconstruction at the decoder is guided by information data which is gathered at the encoder, this information data being derived from determining statistical information on the removed parts of the input data in relation to the after quantization remaining quantized data.

29 Claims, 7 Drawing Sheets

DEVICE AND METHOD FOR CODING A DATA SIGNAL AND DEVICE AND METHOD FOR DECODING A DATA SIGNAL

FIELD OF THE INVENTION

The invention relates to a device for coding an input data signal into an encoded data signal, wherein the device comprises a quantizer for quantization of input data, mapping the input data on quantized data intervals, whereby a part of the input data is removed during quantization.

The invention also relates to a device for decoding a data signal wherein said data signal comprises a quantized data signal, wherein the device comprises a reconstructor for reconstructing a part of the data signal removed during quantization.

The invention also relates to a method for coding an input data signal wherein the input data signal is quantized, mapping the input data on quantized data intervals, whereby a part of the input data signal is removed and to a method for decoding a quantized data signal wherein the part of the data signal removed during quantization is reconstructed.

The invention furthermore relates to a data signal comprising quantized data.

BACKGROUND OF THE INVENTION

A scalar quantizer is defined by its decision levels, which determine the input data range that is mapped onto each quantized data interval, as well as by the reconstruction values corresponding to each quantized data interval. Quantization implies that the accuracy of the quantized data is reduced compared to the non-quantized data; this is done in order to reduce the amount of information contained in the data. In the decoder and the decoding method the "inverse" process of quantization takes place, which is called reconstruction or sometimes also de-quantization. Ideally, during reconstructing the parts of the signal that were removed during quantization are reconstructed to provide the original signal. Quantization is for instance part of any non-lossless data compression scheme. The quantized data is usually efficiently compressed into a compressed data signal. The compressed signal may e.g. be stored on a data carrier or be transmitted to a decoder/decompression unit.

An often used quantization is truncation of least significant bits. The process of truncating, i.e. deleting, least significant bits is a type of quantization in which a uniform quantizer is used with a step corresponding to the number of truncated LSBs. Truncation of Least significant bits is in essence quantization with a quantized data interval of $2^n$ (2, 4, 8, 16 etc).

Quantization, for instance truncating a number of least significant bits before compression, reduces the amount of data to be transferred, at a loss in information transferred. During reconstruction the 'lost' values for the removed part of the data, for instance for the truncated Least Significant Bits, are reconstructed. The reconstruction value is in known methods typically chosen to be in the middle of the step size interval corresponding to a certain quantizer index or quantization step. This is the case for e.g. H.261, MPEG-1, MPEG-2/H.262, H.263, JPEG-2000, and MPEG-4 Part 2. In the case of intra-frame DCT coefficients, which are known to have a distribution that is peaked around zero, a value that is more biased towards zero typically provides better performance. The disadvantage of using known methods for encoding and decoding is that they often result in a considerably high distortion of the reconstructed data signal, which for instance in the case of an image signal results in distortions in the image, especially when a relatively large number of least significant bits (i.e. much of the original information in the input signal) are deleted. The quantization-reconstruction provides for errors.

SUMMARY OF THE INVENTION

The invention aims to improve the quality of the reconstructed data signal while yet only requiring a limited amount of additional data to be transferred.

To this end the method of encoding according to the invention is one wherein statistical information is gathered prior to or during quantization of a set of input data, said statistical information providing information on the relation between the part of the input data removed during quantization and the quantized data, and information data comprising the statistical information is added to the encoded data signal.

The device for coding a data signal in accordance with the invention is one wherein the coding device comprises a determinator for determining statistical information prior to or during quantization of a set of data, said statistical information providing information on the relation between the part of the input data removed by quantization and the quantized data, and the device comprises a combining unit for adding information data comprising the statistical information determined by the determinator to the encoded data signal.

The method for decoding in accordance with the invention is one wherein the method comprises reconstructing the quantized data signal, wherein the data signal comprises information data providing statistical information on the relation between the quantized data signal and the parts of the original data signal removed during quantization, and the information data comprised in the quantized data signal is used for reconstructing the quantized data signal.

The device for decoding in accordance with the invention is one wherein the device comprises a reconstructor for reconstructing the quantized data signal, wherein the data signal comprises information data providing statistical information on the relation between the quantized data signal and the parts of the original data signal removed during quantization, and the device is arranged for receiving and reading the information data comprised in the data signal and the device is arranged for using the information data in reconstructing the quantized data signal.

The data signal in accordance with the invention is one wherein the data signal comprises information data providing statistical information on the relation between the part of the data removed during quantization and the quantized data.

In order to improve the data reconstruction and reduce the quantization error, in the invention statistical information is generated at the encoding end and said statistical information about the reconstruction values to be used during reconstruction (sometimes called "inverse quantization") is added to the encoded data signal. These reconstruction values, which can adapt to the input data statistics, are used instead of predetermined fixed reconstruction values in the known methods. A reconstruction value is the value to be used during reconstruction for the reconstruction of the part of the data signal removed during quantization. At the decoding end the statistical information is used during the reconstruction.

The highest quality improvement is obtained by determining a reconstruction value for each quantized data interval, i.e. the information allows for each quantized data interval to find the reconstruction value for said quantized data interval. However, doing so would require a relatively large overhead. Especially for a compression application, it is preferable to optimize the trade-off between the improvement in reconstruction quality and the required number of bits (or bit rate) for sending the reconstruction values. Therefore, according to a preferred embodiment of the invention, reconstruction values are grouped for several input data intervals, i.e. there is a single reconstruction value is provided for the corrections for a set of quantized data intervals. "A set of" means here more than one. The reconstruction value itself may be send in the data or, in a more general sense, information on the reconstruction value.

A coding device in accordance with a preferred embodiment of the invention is one wherein the quantizer comprises a splitter for splitting the data into Least Significant Bits and Most Significant Bits, and a truncator for truncating a number of least significant bits (LSBs) and the coding device comprises a compressor for compressing of the data signal wherein the determinator is a determinator for determining statistical information prior to or during truncating the Least Significant Bits, said statistical information providing information on the relation between the values of the truncated Least Significant Bits and Most Significant Bits.

The inventor has realized that, especially when Least Significant Bits are truncated, it is advantageous to find correlations between Most Significant Bits (which are present in the quantized data signal) and Least Significant Bits values (which are removed from the quantized data signal) and collect said statistical data prior to or during truncation of the Least Significant Bits. Using this statistical information in decoding enables a more accurate reconstruction to be achieved. The truncated LSB values can be, by using the gathered statistical relations between MSBs and truncated LSB values, more accurately reconstructed at the decoder end. The to be reconstructed LSB values are adaptable to the actual situation, i.e. to the actual information in the original data signal, which could be for instance an image signal. The inventors have found that the statistical relations between MSB data and LSB values are indeed present, can be gathered, and frequently significantly depart from simply taken a fixed point in the step size interval. The gathered statistical information is added to the encoded data signal, which increases the size of the data signal and thereby the amount of data to be handled. However, experiments have shown that the increase in decoder data quality, for instance in image quality when an image data signal is concerned, is much more than would be acquired when simply more image data would be transferred. Surprisingly relatively simple statistical information determining algorithms, requiring only limited computational power, already provide for substantial increases in image quality after decoding, while only requiring a very limited amount of additional data to be sent.

Statistical information on LSB values may be obtained in various ways for MSB values. In a first embodiment an average LSB value is determined for one or more MSB values for a data signal. In principle an average LSB value could be determined for each MSB value, but in preferred embodiments an average LSB value is determined for a number of MSB values. The MSB values are, preferably losslessly, compressed and the statistical data (i.e. the correlation between average deleted LSB value and one or preferably a group of MSB values) is added to the compressed data signal. At the decoder end, the compressed signal, which comprises the compressed MSB data, is decoded and decompressed, and using the statistical correlation between the MSB value and the at the decoder end truncated LSB value, the LSB values are used as a reconstruction value to reconstruct the original values.

In a second embodiment the image data is converted into image coefficients, such as DCT coefficients or wavelet coefficients prior to compression. A matrix of average LSB values for the various DCT coefficients is calculated and sent with the compressed data.

BRIEF DESCRIPTION OF THE DRAWINGS

These and further aspects of the invention will be explained in greater detail by way of example and with reference to the accompanying drawings, in which.

The figures are not drawn to scale. Generally, identical components are denoted by the same reference numerals in the figures.

DETAILED DESCRIPTION OF PREFERRED EMBODIMENTS

Figure 1:
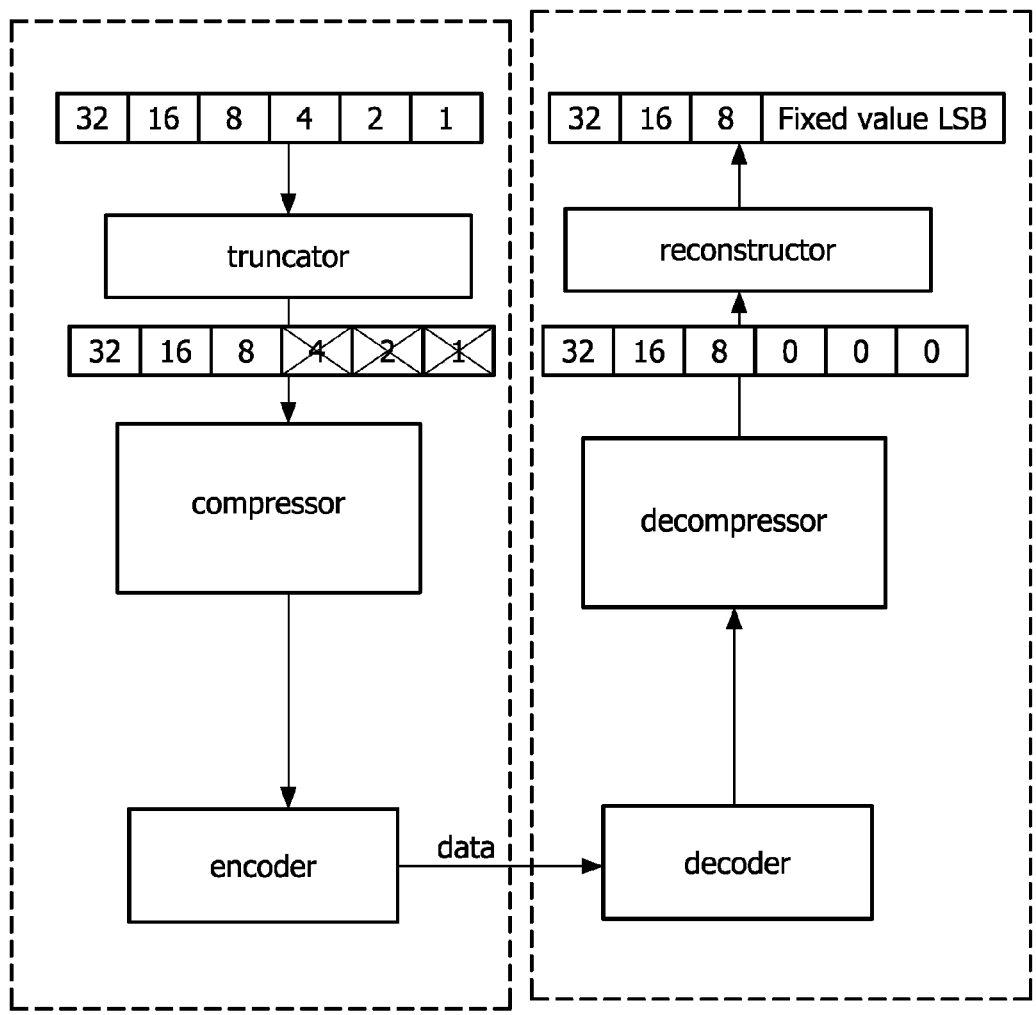
FIG. 1 schematically illustrates a known method and device.

FIG. 1 schematically illustrates a known method. A part of a data signal comprises Most Significant Bits (MSB) and Least Significant bits (LSB). Any digital number can be made by adding up bits, wherein each bits stands for a power of 2: 1, 2, 4, 8, 16, 32, 64, etc. etc. The lowest power bits are the least significant because they are the lowest power bits.

Truncating the Lowest Significant Bits reduces the accuracy of the data since some information is lost. However, the loss is often relatively small given the fact that the LSBs are the least significant. So, in a first step a number of least significant bits, in this example the lowest three, are truncated. Thereafter the remaining bits (the remaining bits are in this example per definition the most significant bits) are compressed and encoded. The encoded compressed data is transferred to a decoding device; the decoding device comprises a decoder and a decompressor. After decoding and decompression the most significant bits are reconstructed. However, the truncated least significant bits are still missing, since they were never sent. During reconstruction the 'lost' values for the truncated Least Significant Bits are reconstructed in a reconstructor. The reconstruction value is in known methods typically chosen to be in the middle of the step size interval corresponding to a certain quantizer index. This is the case for e.g. H.261, MPEG-1, MPEG-2/H.262, H.263, JPEG-2000, and MPEG-4 Part 2. In the case of intra-frame DCT coefficients, which are known to have a distribution that is peaked around zero, a value that is more biased towards zero typically provides better performance. The disadvantage of using fixed reconstruction values is that they result in a higher distortion than the optimal reconstruction values. This disadvantage is present when least significant bits are truncated or, more in general, for any quantization method in which fixed reconstruction values are used during reconstruction.

Figure 2:
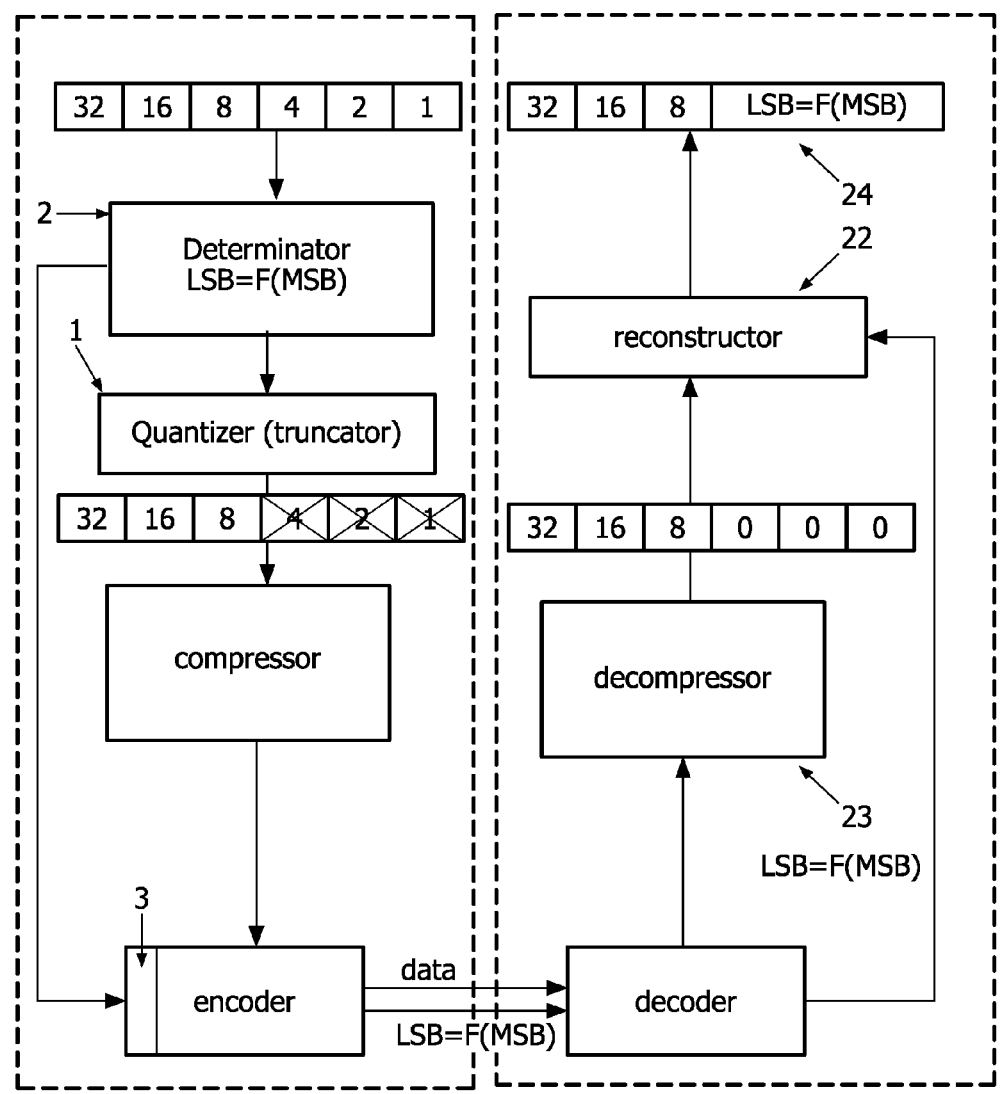
FIG. 2 schematically illustrates devices and methods in accordance with the invention.

FIG. 2 illustrates schematically the invention. Prior to quantization in quantizer 1, in this example embodied by a truncator, a determinator 2 determines a statistical relation (LSB=F(MSB), where F stands for a statistical relationship) between the to be truncated LSB and MSB values. This determination can also be made during truncation, as long as the information is available. In this example the relation is established between the truncated LSB values and the MSB data. In more general terms, a statistical relation is determined between the data that are removed during quantization and the quantized data. This information is provided to the encoder which comprises a combining unit 3, where 3 stands for any means for adding or integrating the information data provided by the determinator into the quantized data stream, where quantized data stream stands for any form in which the quantized data is made. The information can either be made a part of the encoded data, or separately added to the encoded data. The information data on the relationships might be provided in any suitable form. For instance: for each frame a relationship might be provided, or only the differences with previous relationships might be provided. The information data may be generated in the determinator, or may be reformulated later, prior to adding it to the encoded data signal. "Relationship" is any type or form of providing information from which provides a means for finding for a quantized data or a set of quantized data, a correction value to be used to the dequantized data to correct for the data lost during quantization. This may be in the form of a simple look-up table or a formula. The encoded data and the data providing information on the statistical relation between truncated LSB values and encoded MSB values is transferred to the decoder. The decoder decodes and decompresses using decompressor 23 the data, which provides for reconstructed MSB values. Thereafter the reconstructor 22, which has been provided with the statistical information on the relation, comprised in the information data, between the truncated LSB values and the MSB values, i.e. statistical information on the relation between the part of the data signal that has been removed during quantization (in this case the truncated LSB values) and the quantized data signal (in this case the MSB values) (LSB=F(MSB), is able to provide, compared to using a fixed reconstruction value, a better value for the reconstructed LSB values, and thereby for the reconstructed dequantized data signal 24. The information data is received and read by the decoder. As stated before adding information data to the quantized data signal may take any suitable form, as long as the decoder is able to recognize the information data and couple the information to the quantized data in the reconstructor 22. The information data may be integrated into the encoded data signal itself, or on a separate file as long as a link between the encoded data and the information data may be made at the decoder. The invention improves the reconstruction of quantized data (e.g. with truncated LSB values) by using a variable (adaptive) reconstruction value, determined in the determinator for (one or more) quantizer levels, in this example for the situation wherein one or more LSB values are truncated. Information on the reconstruction value for the truncated LSB values to be used is sent from the encoder to the decoder. The insight is that a significant improvement of compression performance is possible when using adaptive reconstruction values, i.e. reconstruction values that are adaptable to the actual removal of data occurring during quantization, instead of fixed reconstruction values. The reconstruction values are adaptive since in the determinator 2 the dependence of LSB values on MSB values (i.e. statistical information on a part of the data that is lost during quantization and the quantized data) is determined and this information (LSB=F(MSB) is added to the encoded data signal and is used at the decoder end in decoding the encoded data signal. The improved performance, allows, even taking into account the bits required to send the adaptive reconstruction values to the decoder, an improved reconstruction. The advantage comes at a price since the encoder is made more complicated since a determinator 2 has to be provided and to the data signal the statistical information has to be added. However, the improvement in reconstruction of the data signal is much more than would be obtainable by adding capacity to the quantized data signal itself. In this example the quantized data is compressed in the encoder and decompressed in the decoder. Compression and decompression are preferred within the framework of the invention but the invention, in its broadest scope, it not restricted to the use of compression or to the use of any particular compression technique, although it can be advantageously used in existing compression techniques.

Various embodiments will be described herein below.

Figure 3:
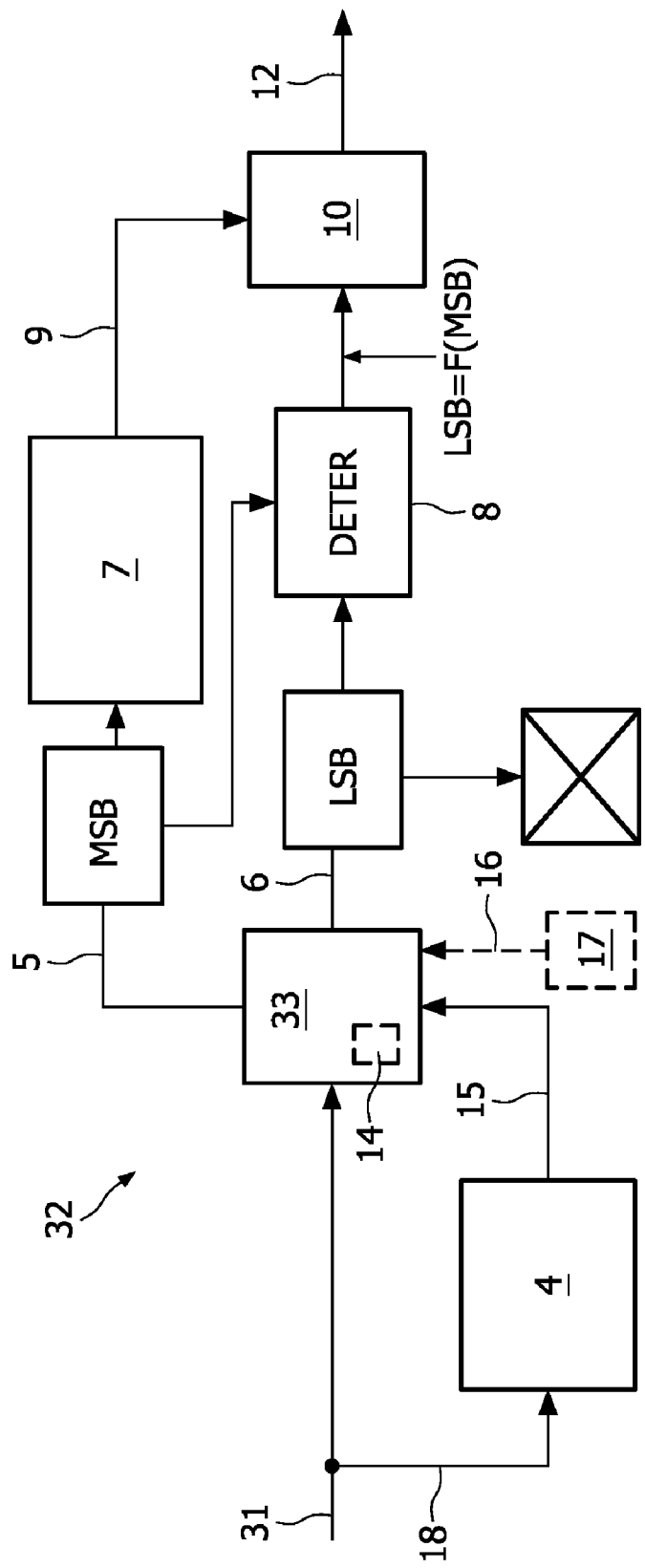
FIG. 3 illustrates an embodiment of the invention.

FIG. 3 illustrates one embodiment:

In FIG. 3, the reference numeral 31 schematically indicates a line via which a signal to be compressed, which comprises units of two or more bits, is fed to a device 32 for compression of the signal. Line 31 is connected to a signal input of the splitting module 33. Line 31 is furthermore connected to a signal input of a control unit 4 via a line 18. The splitting module 33 has a first output line 5 and a second output line 6. Output line 5 is connected to an input of a MSB compressing device 7 for lossless compression of a signal on line 5. An output line 9 of the MSB compressing device 7 is connected to a first input of a combining unit 10.

The core of the device 32 is formed by the splitting module 33, the MSB compressing device 7, a determinator 8 determining a statistical relation between MSB and LSB values and a combining unit 10. The operation of the core unit is as follows. Splitting module 33 receives a signal comprising units of two or more bits via line 31. The signal is split by the splitting module 33, in a manner which is known per se, into an MSB part, which comprises the most significant bit of the unit of two or more bits of the signal, and an LSB part, which does not comprise said most significant bit. The MSB part appears on line 5 and the LSB part appears on line 6. The compressing device 7 compresses the MSB part preferably without loss into a compressed MSB part on line 9.

A unit of two or more bits can be split by the splitting module 33 at one or more positions. The position at which said splitting takes place can be determined in various ways. The splitting module 33 may be permanently arranged for splitting a unit of two or more bits, entering via line 31 at, a predetermined position as is indicated by a control signal unit 14 which forms part of the splitting module 33. According to another possibility, the control signal unit may be arranged externally of the splitting module 33 as is indicated by a line 15 or a line 16. The line 16 forms the connection between a control input of the splitting module 3 and control signal unit 17. Control signal unit 17 generates a control signal which is independent of the signal on the line 31. The control signal generator 4, on the other hand, generates a control signal on line 15 which is dependent on the composition of the signal on line 1 that is to be compressed. Any one of the three possibilities, or a combination thereof, can be selected. In particular control signal unit 14 or control signal unit 4 may be so arranged that the splitting position is determined adaptively within a unit of two or more bits. Adapting the splitting position is a way to control the compression ratio. In general, the more bits are in the LSB part, the higher the compression ratio will be (since there are then more LSBs that are truncated and less MSBs that are compressed into the signal 12).

A digital input signal on line 31 which comprises units of two or more bits and is fed both to splitting module 33 and to control signal unit 4 is analyzed by the control signal unit 4 and split into two parts, that is, a most significant part and a least significant part, hereinafter also referred to as an MSB part and an LSB part, on the basis of the control signal that is delivered to splitting module 33 by the control signal unit 14 on line 15.

The device according to FIG. 3 functions as follows. The (digital) input signal is analyzed and split into two parts: a most significant part (MSB) and a least significant part (LSB). The split of the input signal x can be described mathematically as xm=x div k for the most significant part and xl=x mod k for the least significant part. The setting of $k=2^m$ (with m is an integer for which holds 0; 1; 2; : : : ) is of particular practical importance, since it corresponds to just splitting off the m LSBs from the signal x. The most significant part is then preferably losslessly compressed by a dedicated lossless compression method, such as JPEG-LS. The least significant part LSB and the most significant Part MSB are sent to a determinator 8 which calculates a statistical relation between the LSB and the MSB values. The LSB values are thereafter truncated. Splitting and truncation amounts to quantization the data with a quantized data interval of $2^m$ where m is the number of truncated least significant bits. In FIG. 3 this is illustrated in that the LSB is sent to a waste bin schematically given by a cross in a square. The determinator 8 determines a relation between the truncated LSB values as a function of the MSB values associated with the truncated LSB values. The relation is some statistical relation, providing for an average value for the truncated LSB coupled to data relating to MSBs. Because the relation is determined from real actual values this allows for an adaptive LSB value. The combining unit combines the compressed MSB data with the statistical information into a data signal 12. This data signal thus comprises two parts: compressed MSB data and information data on a statistical relation between truncated LSB values and compressed MSB values.

Compared to previous methods this provides for a significant improvement: The known device and method effectively corresponds to quantizing the data using a uniform quantizer with a step size corresponding to the number of truncated LSBs (e.g. the quantizer step size is 8 in case 3 LSBs are truncated). During reconstruction in known methods the middle value of the interval [an offset of (Q−1)/2, where Q is the quantizer step size, i.e. the quantized data interval] is taken as the average reconstruction value for the truncated LSB. However, when a larger number of LSBs is truncated, the real average truncated LSB value can differ so much from the middle value of the quantized data interval that this leads to noticeable, for images visible, artifacts (especially in intensity jumps between independently compressed neighboring image segments). In the invention a statistical relation between MSB and LSB values is established. For instance during or before compression the average value of the LSBs corresponding to one or more MSB values is determined. "Statistical relation' is to be broadly interpreted: any method by which information is provided which allows in the decoder to reconstruct the truncated LSB value, as a function of the reconstructed MSB values, is a statistical relation, namely it couples the reconstructed MSB value to an LSB value which is then used to reconstruct the LSB value. Simple statistical relations, such as determining the average LSB value for an MSB value have surprisingly proven to give good results.

During decoding the MSB values are accurately reconstructed, since they never were truncated. By using the established average LSB values for reconstructed MSB values a much better reconstruction of the truncated LSB values is performed.

In embodiments multiple MSB values are grouped together, preferably basing the grouping on a subset of the MSBs for each sample.

For example, assume that 4 MSBs are losslessly compressed for each sample (so there are also 4 LSBs for each sample, in case of 8-bit data). If a reconstruction value for each MSB value is sent, 16 values need to be sent, using 16×4=64 bits. If, however, instead only the two most significant bits of the MSBs are considered, only 4 values need to be sent, for a total of 4×4=16 bits. The reconstruction values for the LSBs are then still determined as the average value of the LSBs for all samples of which the two most significant bits equal the selected respective value of 00, 01, 10, or 11. This is an example of a method and device in which for a set of MSBs a common reconstruction value is used.

Using only a small subset of the MSBs, rather than all the MSB values to calculate a statistical relation between MSB and LSB values is based on the following insight. When the image data is typical natural data the MSBs will compress well and thus the number of truncated LSBs (i.e. the quantizer step size) to meet the target compression ratio will be small and a difference in LSB reconstruction values will probably not be visible. Data that is difficult to compress, such as e.g. text, typically only uses a small set of MSB values. For example, for black & white text, it is sufficient to only look at the single most significant bit to provide completely lossless compression. Of course, the number of MSB subsets (as well as the MSB values belonging to each subset) to use could be determined adaptively, depending on the image data. In a preferred embodiment, a fixed number of 4 subsets is used, based on the two most significant bits of each image data sample. For each segment (part of an image line; e.g. 128 samples), the number of MSBs is determined, based on the target compression ratio and how well the MSBs compress and also taking into account the number of bits required to send the 4 LSB reconstruction values (i.e. 4 times the number of LSBs, which equals the number of bits per sample minus the number of MSBs).

To illustrate the performance depending on the number of LSB reconstruction values that are sent, an experiment was performed in which each segment of image data of 128 samples is compressed into 80 bytes (1.6× compression, because the data has 8 bits). The resulting PSNRs for several images and number of LSB reconstruction values are shown in Table 1.

TABLE 1

PSNRs [dB] for several images and LSB reconstruction values

| LSB values: | 0 (i.e. fixed) | 1 | 2 | 4 | 8 |
|---|---|---|---|---|---|
| Target | 40.7 | 41.0 | 41.5 | 43.2 | 43.7 |
| Lena | 52.3 | 52.5 | 52.6 | 52.6 | 52.6 |
| Fonts | 35.0 | 35.3 | ∞ | ∞ | ∞ |

The image Target is a test image containing many different test patterns. Fonts is an image containing black & white text (hence the compression is lossless and the PSNR is infinite when 2 or more LSB reconstruction values are used). As can be seen the improvements obtained with the invention depend on the image content as well as the number of reconstruction values. A preferred embodiment uses 4 reconstruction values (as already explained above.).). Whereas in the above example the LSB reconstruction values (averages) are sent at full accuracy, the LSB reconstruction values could of course also be further quantized and compressed. For example, when 4 LSBs are truncated, the reconstruction values in the signal could contain only the 2 most significant of these LSBs and the remaining 2 less significant bits could be replaced by a fixed value during reconstruction.

Quantization of Intra-frame DCT Coefficients

Image data are often converted into DCT (Discrete Cosine Transform) coefficients before being compressed. The DCT coefficients are arranged in a matrix of DCT coefficients. Each of the DCT coefficients can be quantized using a different scalar quantizer. In the JPEG still image compression standard, for example, uniform quantizers are used and the quantization step size for each quantizer is specified using an 8×8 matrix of step sizes. A typical matrix is the following:

$$\begin{bmatrix} 16 & 11 & 10 & 16 & 24 & 40 & 51 & 61 \\ 12 & 12 & 14 & 19 & 26 & 58 & 60 & 55 \\ 14 & 13 & 16 & 24 & 40 & 57 & 69 & 56 \\ 14 & 17 & 22 & 29 & 51 & 87 & 80 & 62 \\ 18 & 22 & 37 & 56 & 68 & 109 & 103 & 77 \\ 24 & 35 & 55 & 64 & 81 & 104 & 113 & 92 \\ 49 & 64 & 78 & 87 & 103 & 121 & 120 & 101 \\ 72 & 92 & 95 & 98 & 112 & 100 & 103 & 99 \end{bmatrix}$$

Thus, depending on the DCT coefficient or corresponding quantizer, the reconstruction values can have a different range: from 0 to 10 (or −5 to +5, when the middle of the range is taken as a bias) for the quantizer with the smallest step size up to 0 to 121 for the quantizer with the largest step size. In this example quantization is generally not performed by truncating least significant bits. Truncating least significant bits is equivalent to using a scalar quantizer of 2, 4, 8, 16, 32, 64 etc. For five of the coefficients the scalar quantizer is indeed 16 or 64 so for those DCT coefficients quantization would amount to truncation of a (4 respectively 6) number of least significant bits. For the other DCT coefficients, however, the quantization is not by a power of 2 ($2^n$) so the quantization is somewhat more elaborate. For each of the coefficients the input data is divided by the scalar quantizer. This will give a quantized data plus a remainder (rem), where the 'remainder' is lost during quantization. For instance for an input value of 30, 50 and 95 the following quantization steps (also called "quantized data interval") would give the following quantized values with remainders:

receives the quantized data and reconstructs the data by multiplying the quantized data by the quantizer and add a fixed correction value.

The inventor have realized that, by calculating prior to or during the quantization statistical information on the relation between the quantized data and the remainder (=the correction value), the reconstruction can be greatly improved.

To give two simple examples:

EXAMPLE A

If for a DCT coefficient with a scalar quantizer of 10 for a given picture the DCT value is 32±2 (with a gaussian distribution) over the picture, the standard method will provide a single value: 100% having a quantized value of 3. The decoder will, at the decoder end, multiply the value with the quantized data interval (=10), and add 5 (=0.5 times the quantized data interval) to the result, giving a single result: 35. The average has then be changed from the original 32 to the reconstructed 35 leading to image errors.

EXAMPLE B

If for a DCT coefficient with a scalar quantizer of 10 for a given picture the DCT value is 30±4 (with a gaussian distribution) over the picture, the standard method will provide two values: 50% having a quantized value 2 and 50% having a quantized value 3. The decoder will, at the decoder end, multiply the quantized data value with the quantization data interval (=10) of the scalar quantizer, and add 5 to the result, giving two reconstruction values: 50% of the reconstructed data having a reconstructed value of 25, and 50% having a reconstructed value of 35. The original distribution in values prior to quantization (a gaussian distribution with a width of 4 around a peak value of 30, has thus been reconstructed by two peaks (at 25 and at 35) each lying outside the original distribution. The spread in signal has thus been greatly increased by the quantizing-dequantizing steps. This will lead to image errors.

In the invention the statistical relation between the quantized data (i.e. 2 or 3) and the remainder for these quantized

| Quantization step | 30 Quantized value | rem | 50 Quantized value | rem | 95 Quantized value | Rem | Average remainder/ quantization step |
|---|---|---|---|---|---|---|---|
| 10 | 3 | 0 | 5 | 0 | 9 | 5 | 0.33 |
| 12 | 2 | 6 | 4 | 2 | 7 | 11 | 0.53 |
| 16 | 1 | 14 | 3 | 2 | 5 | 15 | 0.67 |
| 19 | 1 | 11 | 2 | 12 | 5 | 0 | 0.40 |
| 26 | 1 | 4 | 1 | 24 | 3 | 17 | 0.53 |
| 40 | 0 | 30 | 1 | 10 | 2 | 15 | 0.46 |
| Average Remainder/ Qunatization step | | 0.48 | | 0.35 | | 0.56 | |

The remainder is always somewhere between 0 and the maximum of the quantized data interval minus one. In the table also the averages of the remainder divided by the quantization step are indicated. If the average of the averages is taken a value of 0.48 is found, i.e. close to the middle value of the quantized data interval of the scalar quantizer, i.e. on average the remainder is often half the quantization step, as is used in the known methods. However, the table also shows that for many of the input data very significant errors occur if the reconstructed value is simply taken to be the quantized data+half the quantization step. In the prior art, the decoder data will be calculated prior to quantization. This will lead to an average remainder between 1 and 2 or between −1 and −2 depending on the used algorithm to calculate the average.

The following information is added to the data file for the decoder:

If quantized data=3, add 2 to dequantized data, if quantized data=2 add 8 (=10−2) to dequantized data. This will lead to two reconstructed values: 50% of the reconstructed data having a value of 28, 50% having a value of 32. Although the average value is the same as when using the prior art coding method, namely 30, the spread in the reconstructed values is strongly reduced, and is now more or less the same as in the original signal before quantization. The invention thus leads to a much improved reconstruction.

In a preferred embodiment, the correction values would be integers, such that they would be e.g. 0, 1, 2 . . . 9 (or −5, −4, . . . , 4, 5) for the quantizer with the smallest step size. In a preferred embodiment, a single correction value would be used for each quantizer, independent of the input data value (or corresponding quantizer level). In another preferred embodiment, the correction value would depend on the value of the input data. For example on the absolute value. For example, for the quantizer with step size 10, a first correction value could be used if the absolute value of the reconstruction value is smaller than e.g. 50, and a second correction value could be used if the absolute value were larger than 50. The number of different correction values that is used would typically depend on the probability density function (pdf) of the quantized data. In general, the more the slope of the pdf changes, the larger the benefit of using more different correction values becomes.

In the above embodiments relating to DCT coefficients scalar quantizers having widely varying quantized data intervals have been used.

In more simple arrangements, each of the DCT coefficients can be, e.g. in a method and device equivalent to the one described above in relation to previously described embodiments, split into an MSB part and an LSB part. The LSB value of each DCT coefficient can be truncated and the MSB data can be compressed. For instance the interval for truncating the LSB could be set at 32, i.e. the last 5 bits are truncated. The quantized data interval is then the same for all DCT coefficients, namely $2^5=32$. Without correction of the reconstructed values (i.e. setting the missing least significant bits to zero) this resulted, in an experiment, in a PSNR of 31.62 dB. Applying a fixed correction of ¼ of the interval (i.e. add a correction value of 32/4=8 during reconstruction) improved the PSNR to 32.52 dB.

This correction is better than applying the usually used fixed correction of ½ the interval, with a PSNR of 26.69 dB. However, it turns out that in this case a fixed correction of ⅛ of the interval is even better, since it results in a PSNR of 33.87 dB.

However, using the invention even better results are obtainable. A single correction value for the whole image for each DCT coefficient is determined. The correction was determined as the average error for each DCT coefficient across the whole image (i.e. across all DCT blocks) and rounding this to the nearest whole number. Since 5 bits are missing, the range of each correction value could in principle be 0 . . . 31. The actual range turns out to be only 2 . . . 16. In fact, the 8×8 matrix of correction values is:

| 16 | 12 | 9 | 7 | 5 | 4 | 4 | 3 |
| 11 | 9 | 7 | 6 | 5 | 4 | 3 | 3 |
| 7 | 6 | 6 | 5 | 4 | 4 | 3 | 3 |
| 5 | 5 | 5 | 4 | 4 | 3 | 3 | 2 |
| 4 | 4 | 4 | 3 | 3 | 2 | 2 | 2 |
| 3 | 3 | 3 | 3 | 3 | 2 | 2 | 2 |
| 2 | 2 | 2 | 2 | 2 | 2 | 2 | 2 |
| 2 | 2 | 2 | 2 | 2 | 2 | 2 | 2 |

This correction according to the invention improves the PSNR to 35.05 dB, an improvement over the best fixed correction case of 35.05−33.87=1.18 dB (or significantly more when a different fixed correction than ⅛ of the interval is used). In order to achieve the same PSNR improvement without the proposed invention, the bit rate would have to be increased from about 0.6 bit/pixel to about 0.7 bit/pixel, an increase of 16%. Since the image has 512×512=262144 pixels, an increase of 0.1 bit/pixel corresponds to an increase of about 26214 bits. This is much more than is required to send the correction matrix. Even a straightforward transmission, using 5 bits per entry, would require only 5×64=320 bits. For a more efficient transmission, the matrix entries would preferably be differentially transmitted (along a zigzag scan line), using also variable-length coding.

Figure 4:
FIGS. 4 to 6 illustrates an experiment showing the advantageous effect of the invention.
Figure 5:
Figure 6:

When looking at the visual quality of the compressed image, the improvement provided by the proposed invention is also clearly visible. In FIG. 4 the reconstructed image is shown in case no correction is applied to the DCT coefficients (PSNR of 31.62 dB). FIG. 5 shows the results of the fixed Q/8 correction (PSNR of 33.87 dB). Finally, FIG. 6 shows the resulting image with the proposed correction (PSNR of 35.05 dB), which clearly improves the picture quality. In case a compression method is applied that uses visual weighting of the quantization errors (such as e.g. the JPEG standard), the possible range of the correction values depends of course on the weighting matrix and is typically different for each DCT coefficient (i.e. the range runs from 0 to the "Q value in the matrix minus 1" for the JPEG standard compression). Also in this case, differential zigzag transmission may be used to increase the efficiency of sending the corrections.

For non-scalable compression methods, the correction matrix needs to be sent only once. For scalable compression methods, the range of the correction values changes after each subsequent bit plane has been received. Therefore, new correction values are preferable sent after each complete bit plane. To efficiently transmit them, an additional option (i.e. in addition to sending them differentially according to the zigzag scan) is to send the correction values differentially compared to the values for the same coefficients after the previous bit plane (e.g. by using the previous correction value divided by 2 as a prediction of the new correction value).

The invention can be applied to improve the quality of quantized data. It is especially beneficial in the area of image or video compression and could become part of future standards in this area. The transferred information could also be sent in a backward-compatible way in a standard bit stream, as part of the "private data" or "auxiliary data" (so those new decoders knowing how to interpret this data can benefit), or be enabled by a simple extension of an already existing standard (so all new decoders know how to interpret the data and can benefit), such as a new SEI message definition for MPEG4-AVC/H.264.

Figure 7:
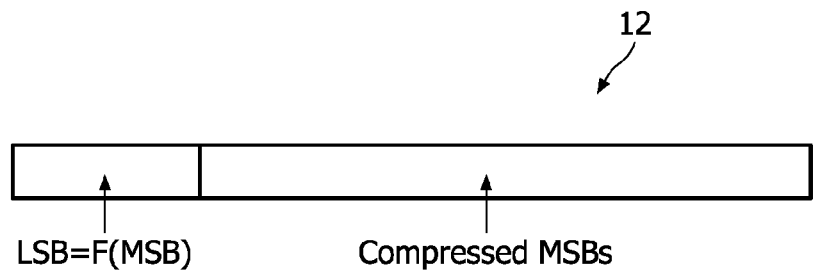
FIG. 7 illustrates a data signal in accordance with the invention.

FIG. 7 schematically illustrates a data signal. The data signal comprises quantized data, in this example quantized and compressed MSB data and information data on statistical information between the data removed during quantization and the quantized data LSB=F(MSB). Often the information will be in the form of correction values for certain quantized data intervals. The information may be more specific, for instance the correction values may not only be made dependent on the quantized data interval, but also on the value of the data itself.

Figure 8:
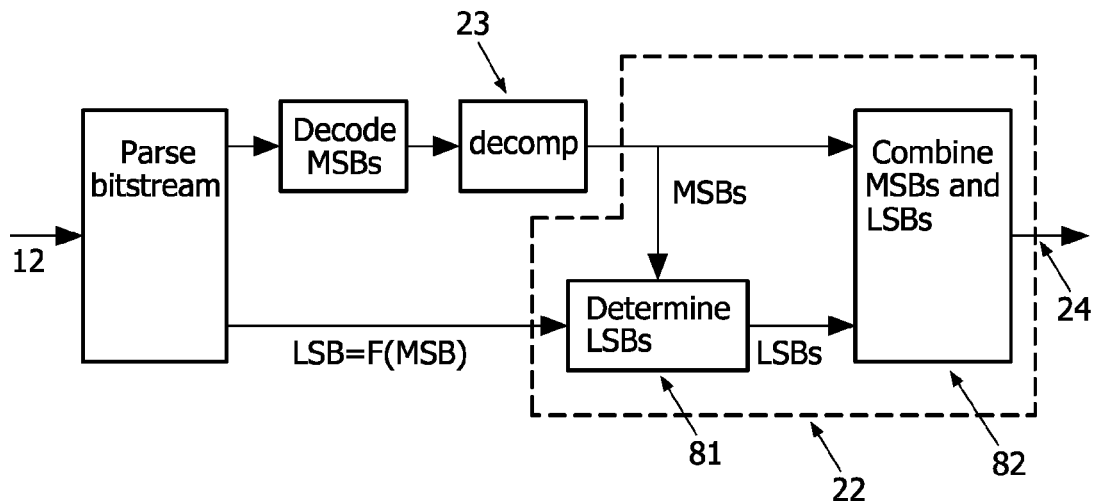
FIG. 8 illustrates a decoder in accordance with the invention.

FIG. 8 illustrates a decoder and decoding method in accordance with the invention.

The incoming encoded quantized and (in this example also) compressed signal 12 is received. The signal 12 is parsed and the part of the signal providing information on the MSB is decoded and decompressed (23). The signal part comprising the statistical information providing information on the relation between the part of the input data removed during quantization (=LSB) and the quantized data (MSB), i.e. LSB=F(MSB), is sent to reconstructor 22. In this example the statistical information data is sent directly. In case the statistical information data would itself be compressed, the statistical information data would first be decompressed before being sent to the reconstructor 22 or the reconstructor 22 would have a part for decompressing the statistical information data. The reconstructor 22 comprises a determinator 81. Said determinator has as inputs the MSB values and the statistical information LSB=F(MSB). Using the information on the statistical relation between the decoded MSB values and the MSB values themselves the corresponding LSB values are determined in the determinator 81. The MSB and LSB values are combined in combiner 82.

The invention can be applied to the quantization of all kinds of data or signals. For example subband transform coefficients, wavelet transform coefficients, Walsh-Hadamard transform coefficients, video signals, images, audio signals, speech signals, spectral data, radar signals, etc.

In short the invention can be described as follows:

In a method for encoding and an encoder statistical information is generated and said statistical information about the reconstruction values to be used during reconstruction (sometimes called "inverse quantization") is added to the encoded data signal. The encoded data signal comprises data information providing information on the relation between parts of the original input data removed during quantization and the quantized data. The decoder and decoding method use the information data during reconstruction. This enables reconstruction values to be used during reconstruction that can adapt to the input data statistics thereby improving data reconstruction and reducing the quantization error. A reconstruction value is the value to be used during reconstruction for the reconstruction of the part of the data signal removed during quantization. The reconstruction at the decoder is guided by information data which is gathered at the encoder, this information data being derived from determining statistical information on the removed parts of the input data in relation to the after quantization remaining quantized data.

It is remarked that, within the concept of the invention, determinator, truncator, compressor etc should be broadly understood to comprise e.g. any piece of hard-ware, any circuit or sub-circuit designed for performing or aiding in a calculating, truncation, compression etc as described as well as any piece of soft-ware (computer program or sub program or set of computer programs, or program code(s)) designed or programmed to perform an action in accordance with the invention as well as any combination of pieces of hardware and software acting as such, without being restricted to the below given exemplary embodiments. In embodiments more than more than one element may be combined into one piece of hardware or software. One piece of software or hard ware may also perform more than one function.

It will be appreciated by persons skilled in the art that the present invention is not limited by what has been particularly shown and described hereinabove. The invention resides in each and every novel characteristic feature and each and every combination of characteristic features. Reference numerals in the claims do not limit their protective scope. Use of the verb "to comprise" and its conjugations does not exclude the presence of elements other than those stated in the claims. Use of the article "a" or "an" preceding an element does not exclude the presence of a plurality of such elements.

The present invention has been described in terms of specific embodiments, which are illustrative of the invention and not to be construed as limiting. The invention may be implemented in hardware, firmware or software, or in a combination of them. Other embodiments are within the scope of the following claims. It is remarked that to each preferred embodiment described in relation to a coding device and/or a coding method a corresponding decoding device and method for decoding exists, even though not explicitly described for reasons of brevity in description. Such decoding device and decoding method also form preferred embodiments.

The invention claimed is:

1. Device for coding an input data signal into an encoded data signal, wherein the device comprises a quantizer (1) for quantization of input data, mapping the input data on quantized data intervals, whereby a part of the input data is removed during quantization, wherein the coding device comprises a determinator (2, 8) for determining statistical information (LSB=F(MSB)) prior to or during quantization of a set of input data, said statistical information providing information on the relation between the part of the input data removed during quantization and the quantized data, and a combining unit (3, 10) for adding information data comprising the statistical information determined by the determinator to the encoded data signal.

2. Device for coding an input signal as claimed in claim 1, wherein the determinator is arranged for determining a separate reconstruction value for the part of the input data removed during quantization for each quantized data interval.

3. Device for coding an input signal as claimed in claim 1, wherein the determinator is arranged for determining a common value for the reconstruction values for a set of quantized data intervals.

4. Device for coding an input signal as claimed in claim 1, wherein the quantizer comprises a splitter (33) for splitting the data into Least Significant Bits and Most Significant Bits, and a truncator for truncating a number of least significant bits (LSBs) and the determinator (8) is arranged for determining statistical information prior to or during truncating the Least Significant Bits, said statistical information providing information on the relation between the values of the truncated Least Significant Bits and the values of the Most Significant Bits and the combining unit (10) is arranged for adding information data comprising said statistical information to the encoded data signal.

5. Device as claimed in claim 4, wherein the determinator is arranged for determining an average LSB value for one or more MSB values for a data signal and for including information on the average LSB value in the statistical information.

6. Device as claimed in claim 5, wherein the determinator is arranged for determining an average LSB value for a set of MSB values.

7. Device as claimed in claim 1, wherein the input data is arranged in transform coefficients, and the determinator is arranged for determining one or more reconstruction values for each transform coefficient.

8. Device as claimed in claim 1, wherein the input data is arranged in transform coefficients, and the determinator is arranged for determining a common reconstruction value for a set of transform coefficients.

9. Device as claimed in claim 1, wherein the device comprises a compressor for compressing the quantized data.

10. Method for coding an input data signal, the method comprising the steps of:

quantizing the input data signal, mapping the input data signal on quantized data intervals, whereby a part of the input data signal is removed, gathering statistical information prior to or during quantization of a set of data, the statistical information providing information on the relation between the part of the input data removed during quantization and the quantized data, and adding information data comprising the statistical information to the encoded data signal.

11. Method as claimed in claim 10, wherein a separate reconstruction value for the part of the input data removed during quantization for each quantized data interval is determined.

12. Method as claimed in claim 10, wherein a common reconstruction value for a set of quantized data intervals is determined.

13. Method as claimed in claim 10, wherein the coding comprises the steps of:

splitting the input data into Least Significant Bits(LSBs) and Most Significant Bits (MSBs), truncating a number of least significant bits (LSBs) wherein statistical information is gathered prior to or during truncating the Least Significant Bits, said statistical information providing information on the relation between the values of the truncated Least Significant Bits and quantized Most Significant Bits and adding said statistical information to the encoded data signal.

14. Method as claimed in claim 13, wherein the data is arranged in transform coefficients, and a common reconstruction value for a set of transform coefficients is determined.

15. Method as claimed in claim 10, wherein the quantized data is compressed.

16. Device for decoding a data signal (12) wherein said data signal comprises a quantized data signal, the device comprising:

a reconstructor (22) for reconstructing a part of the data signal removed during quantization wherein the data signal comprises information data providing statistical information on the relation between the quantized data signal and the parts of the original data signal removed during quantization (LSB=F(MSB)), and the device is arranged for receiving and reading the information data comprised in the data signal and wherein the device is arranged for using the information data in reconstructing the quantized data signal (24) by assigning the reconstruction values to the quantized data intervals.

17. Device for decoding as claimed in claim 16 wherein the device is arranged for receiving a compressed quantized data signal, and the device comprises a decompressor (23) for decompressing the signal.

18. Device for decoding a data signal as claimed in claim 16 wherein said data signal comprises a quantized data signal derived from Most Significant Bits of an original data signal and truncated of Least Significant Bits of the original data signal, wherein the device comprises a reconstructor for reconstructing the truncated Least Significant Bits wherein the device is arranged for receiving information data comprising statistical information providing information on the relation between the values of the truncated Least Significant Bits and Most Significant Bits, and arranged for providing said information to the reconstructor (22), the reconstructor being arranged for using the information for reconstructing the Least Significant Bits.

19. Device as claimed in claim 18, wherein the information includes information on an average LSB value for one or more MSB values, and the reconstructor reconstructs the LSB values in accordance with this information.

20. Device as claimed in claim 19, wherein the information includes information on an average LSB value for a set of MSB values.

21. Method for decoding a data signal wherein the part of the data signal removed during quantization is reconstructed wherein the method comprises the steps of:

reconstructing the quantized data signal, wherein the data signal comprises information data providing statistical information (LSB=F(MSB)) on the relation between the quantized data signal and the parts of the original data signal removed during quantization, wherein the information data comprised in the quantized data signal is used for reconstructing the quantized data signal by assigning reconstruction values to quantized data intervals used during quantization.

22. Method for decoding a data signal as claimed in claim 21 wherein the quantized data signal is compressed, and the method for decoding comprises a decompressing step.

23. Method for decoding as claimed in claim 21 wherein said data signal comprises a quantized data signal derived from Most Significant Bits of an original data signal and truncated of Least Significant Bits of the original data signal, wherein the method comprises reconstructing the truncated Least Significant Bits wherein the data signal comprises information data providing statistical information on the relation between the values of the truncated Least Significant Bits and Most Significant Bits, and the information is used for reconstructing the Least Significant Bits.

24. Method as claimed in claim 23, wherein the compressed data signal comprises information on an average LSB value for one or more MSB values for a data signal and included in the statistical information.

25. Method as claimed in claim 24, wherein the compressed data signal comprises information on an average LSB value for one or more MSB values for a data signal and included in the statistical information.

26. A method for coding an input data signal to obtain an encoded data signal, the method comprising the steps of:

quantizing the input data signal to obtain quantized data, obtaining information data providing statistical information on the relation between the part of the data removed during quantization and the quantized data, and providing said information data in the encoded data signal.

27. Method as claimed in claim 26 wherein the information data comprise a reconstruction value for the part of the input data removed for each quantized data interval employed in said quantization step.

28. Method as claimed in claim 27, wherein the information data comprise a common value for the reconstruction values for a set of quantized data intervals.

29. Method as claimed in claim 26 wherein said quantizing step comprises truncating least Significant Bits of an original signal, and wherein the information data comprises statistical information on the relation between the values of truncated Least Significant Bits and quantized Most Significant Bits.

* * * * *